Dec. 17, 1963    H. C. SULLIVAN ETAL    3,114,826
HIGH-TEMPERATURE SPRAY APPARATUS
Original Filed June 16, 1958    3 Sheets-Sheet 1

INVENTORS
HUBERT C. SULLIVAN
RENO W. PRICHARD
BY
ATTORNEY

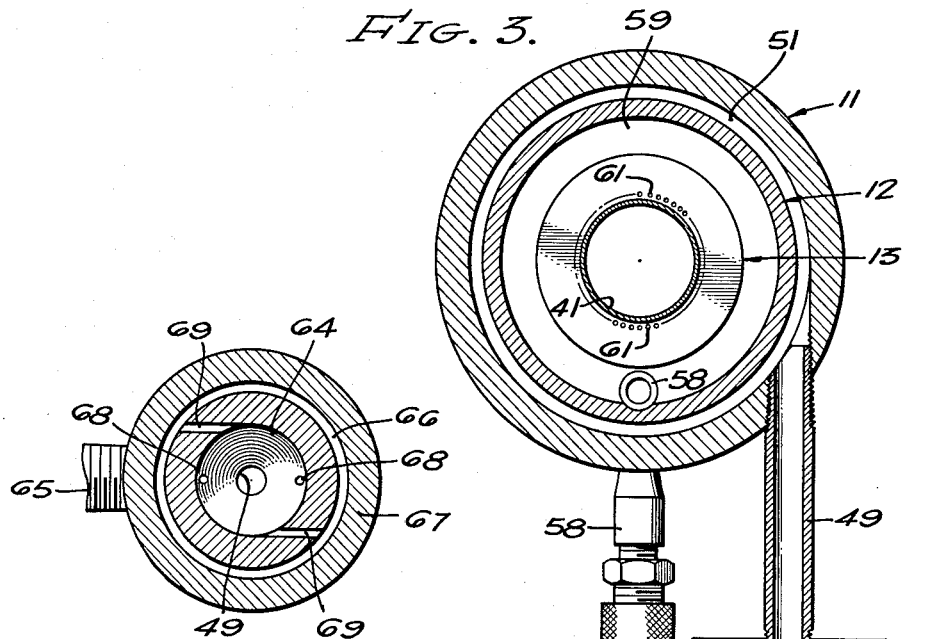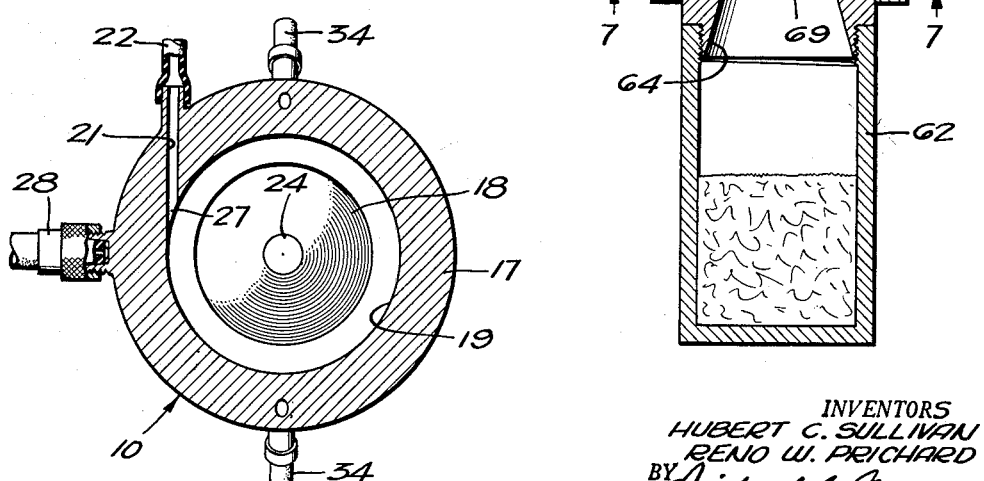

Dec. 17, 1963 H. C. SULLIVAN ETAL 3,114,826
HIGH-TEMPERATURE SPRAY APPARATUS
Original Filed June 16, 1958 3 Sheets-Sheet 3

INVENTORS
HUBERT C. SULLIVAN
RENO W. PRICHARD
BY
ATTORNEY

United States Patent Office 3,114,826
Patented Dec. 17, 1963

3,114,826
HIGH-TEMPERATURE SPRAY APPARATUS
Hubert C. Sullivan, Grosemont, and Reno W. Prichard, Newport Beach, Calif., assignors to Plasmadyne Corporation, Santa Ana, Calif., a corporation of California
Continuation of application Ser. No. 742,194, June 16, 1958. This application June 6, 1962, Ser. No. 201,235
11 Claims. (Cl. 219—76)

This invention relates to an apparatus and method for spraying substances at very high temperatures. More particularly, the invention relates to the injection of powders into a high-temperature, high-velocity flame or jet. This application is a continuation of our co-pending application Serial No. 742,194, filed June 16, 1958, for High-Temperature Spray Apparatus and Method, now abandoned.

The present method and apparatus constitute an improvement over the basic spray method and apparatus disclosed in Patent No. 2,922,869, issued January 26, 1960, for Plasma Stream Apparatus and Methods, inventors Gabriel M. Giannini and Adriano C. Ducati.

It is an object of the present invention to provide a method and apparatus for effecting spraying of a workpiece with a desired metal or ceramic, including numerous compounds, in a highly efficient and effective manner.

A further object of the invention is to provide a method and apparatus for introducing a coating powder or liquid into a high-temperature flame at a point outside the torch generating the flame, in combination with a method and apparatus for separately introducing cooling gas around the flame for the purpose of cooling or protecting the workpiece.

An additional object of the invention is to provide a method and apparatus for introducing a coating substance into the throat or narrow portion of a diffuser means, so that subsequent expansion of the flame in the diffuser results in highly efficient melting of the coating substance and application thereof onto the workpiece.

Another object is to provide a method and apparatus for introducing a coating substance into a flame in a vortical manner and at a location outside the electric plasma torch generating the flame, the direction of rotation being opposite to the direction of rotation of constricting gas employed in the torch.

These and other objects and advantages of the invention will be more fully set forth in the following specification and claims, considered in connection with the attached drawings to which they relate.

In the drawings:

FIGURE 3 is a transverse section taken on line 3—3 of FIGURE 1;

FIGURE 4 is a transverse section taken on line 4—4 of FIGURE 1, showing the manner of introduction of constricting gas into the torch;

FIGURE 7 is a section on line 7—7 of FIGURE 3.

Figure 1:
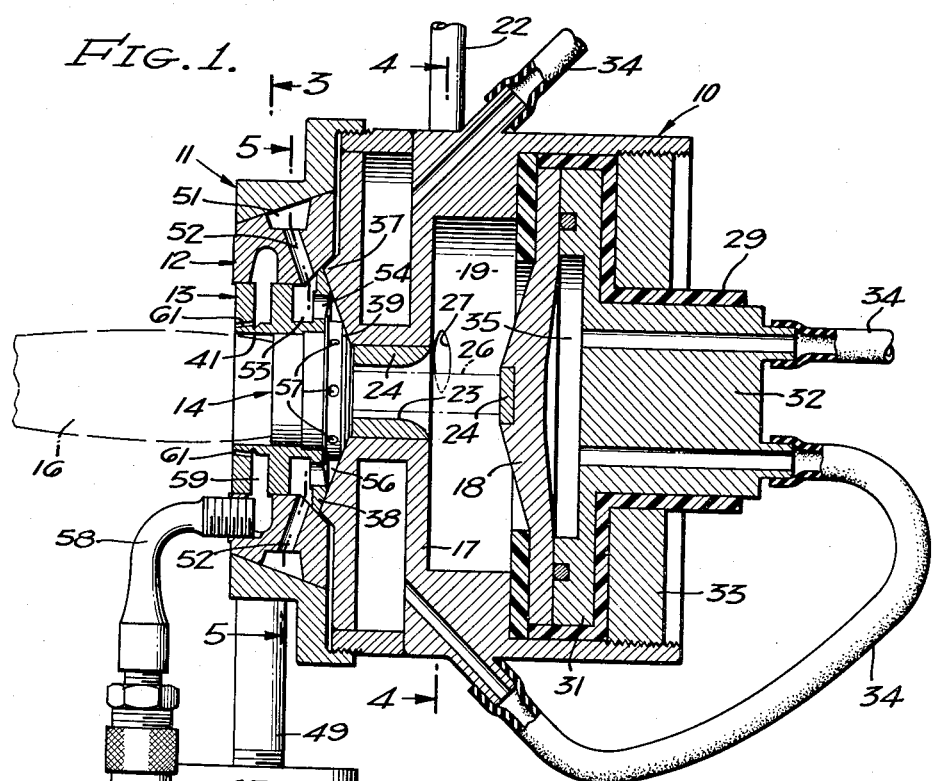
FIGURE 1 is a longitudinal sectional view illustrating an apparatus constructed in accordance with the present invention.

Referring to the drawings, the apparatus is illustrated to comprise an electrical plasma jet torch 10, a retaining ring 11, a coating substance feeding ring 12 mounted radially inwardly of the retaining ring, a cooling nozzle ring 13 mounted in the ring 12, and an expansion ring 14 mounted within ring 13 and forwardly adjacent the nozzle opening in torch 10.

The elements 12–14 are adapted, in combination with certain other elements which will be described subsequently, to effect feeding of a coating substance into an external jet or flame 16 of electrical plasma generated in torch 10. They are also adapted, as will be set forth in detail hereinafter, to effect cooling of the workpiece in an efficient manner and independently of the injection of coating substance into the flame.

Proceeding first to a description of the plasma jet torch 10, this is of the general type set forth in the above-cited co-pending patent applications, especially with reference to FIGURE 3 of the drawings thereof, and will not be described in great detail herein. Stated generally, the torch 10 comprises a nozzle electrode 17 and a back electrode 18 both of which are generally disc-shaped. Provided between the electrodes 17 and 18, and in coaxial relationship therewith, is an annular arc chamber 19 into which gas is introduced through a tangential passage indicated at 21 in FIGURE 4. Passage 21 communicates with a hose 22 leading to a suitable source, not shown, of gas, preferably an inert gas such as argon, under a pressure substantially higher than ambient.

Because of the tangential relationship of passage 21, the gas whirls in the arc chamber 19 and then passes, in a whirling manner, through the nozzle opening 23 which is provided axially of nozzle electrode 17. When a voltage is applied across the electrodes 17 and 18, an electric arc may be initiated and maintained between the central electrode portions, the latter being protected by inserts 24 formed of a suitable refractory metal such as tungsten.

By reason of the insulating characteristics of the whirling gas, the electric arc is constricted to the vortex formed by the gas in the arc chamber and in the nozzle opening 23, so that its current density and temperature are greatly increased. The external jet or flame 16 of plasma, which is generated as an incident to the constricted electric arc, jets out the nozzle opening 23 and through the above-indicated elements 13 and 14 at a high velocity and temperature. The combined arc and plasma within the torch 10 is indicated at 26, whereas the portion outside the torch is indicated at 16 as previously stated.

The absolute gas pressure of the whirling gas in the chamber 19, near the inlet opening 27 from passage 21, should be at least 1.6 times the absolute pressure of the atmosphere in which the torch is operated. The diameter of chamber 19 should be more than two times the diameter of nozzle opening 23, and the diameter of inlet opening 27 should be less than the diameter of nozzle opening 23. The distance between the central portion of plate 18 and the adjacent portion of nozzle electrode 17, that is to say the distance between the adjacent portions of inserts 24, should be about one to two times the diameter of nozzle opening 23 and should not be more than four times such diameter.

The current supplied to the electrodes 17 and 18 is large, for example five hundred amperes, but the voltage is relatively low, such as one hundred volts. The current should be direct, it being important that the nozzle electrode 17 be negative and the base electrode 18 positive. The current is supplied from a source, not shown, to suitable leads one of which is indicated at 28 in FIGURE 4.

The back electrode 18 is suitably insulated from nozzle electrode 17 by insulation 29, and is in electrical contact with the radial flange 31 of a body or stem 32. The elements are held in assembled relationship by retaining means 33 which is threaded into a skirt portion of nozzle electrode 17. The electrodes are cooled by a suitable coolant, such as water, which circulates through hoses 34 and through cooling chambers 35 in or behind the electrodes.

Proceeding next to a description of the various spray elements 11–14 which are associated with the torch 10, the retaining ring 11 is shown as threaded over the outer front portion of nozzle electrode 17. The retaining ring is formed with an interior frustoconical surface which abuts a corresponding exterior frustoconical surface of the gas and powder feeding ring 12, the relationship being such that the latter ring is held against axial shifting and with its inner end adjacent an annular ridge 37 provided on the forward face of nozzle electrode 17. The inner end portion of cooling nozzle ring 13 has a flange 38 which abuts the ridge 37 and is seated under a bevelled shoulder formed at the inner end of ring 12. Except at the flange 38 and corresponding shoulder portion of ring 12, the mating surfaces of rings 12 and 13 are cylindrical and coaxial with the torch 10.

The expansion ring 14, which is also seated against the ridge 37 along a frustoconical wall thereof, has a radial flange 39 which fits beneath a bevelled shoulder formed at the inner end of ring 13 radially inwardly of flange 38. The front or body portion of the expansion ring 14 is generally cylindrical at its exterior surface, and seats closely against the corresponding cylindrical interior wall 41 of cooling nozzle ring 13. The body of the expansion ring 14 terminates at a point located a substantial distance inwardly from the forward face of cooling nozzle ring 13.

The expansion ring 14 is formed radially inwardly of flange 39, that is to say immediately in front of the insert 24 in nozzle electrode 17, with a cylindrical throat portion 46 which is coaxial with the nozzle opening 23. The wall of throat 46 merges with a frustoconical wall 47 which forms the interior wall of the body of ring 14, and diverges outwardly or away from torch 10. The front or outer end of wall 47 has a diameter only slightly less than that of inner wall 41 of cooling nozzle ring 13. The diameter of throat 46 should be slightly greater than that of nozzle opening 23, to permit striking of the electric arc at the radial front wall of insert 24 as indicated at 48, and as described in the above-cited patent applications.

The hot plasma emanating from nozzle opening 23 expands greatly in the divergent portion of expansion ring 14, and increases from the relatively small diameter indicated at 26 in FIGURE 1 to the relatively large diameter indicated at 16 therein. This expansion is important to the operation of the spray apparatus, for reasons including the fact that it greatly improves the mixing of coating substance in flame 16 and improves the manner of application of the coating substance onto the work.

The exact taper angle of the wall 47 may vary somewhat, being governed by the pressure-volume-temperature characteristics of the mixture of plasma and coating substance, it being understood that the coating substance is injected at the throat 46 as will be described subsequently. The design of the wall 47 of the expansion ring or nozzle is computed for optimum velocity and uniformity of impingement of the coating material onto the surface to be treated.

In the illustrated embodiment, the coating substance is introduced in powder form with a gas carrier, through a pipe 49 which communicates tangentially with an annular passage or chamber 51. The passage or chamber 51, as best shown in FIGURES 1 and 5, comprises an annular groove formed in the gas and powder feeding ring 12, and covered by the retaining ring 11.

Figure 2:
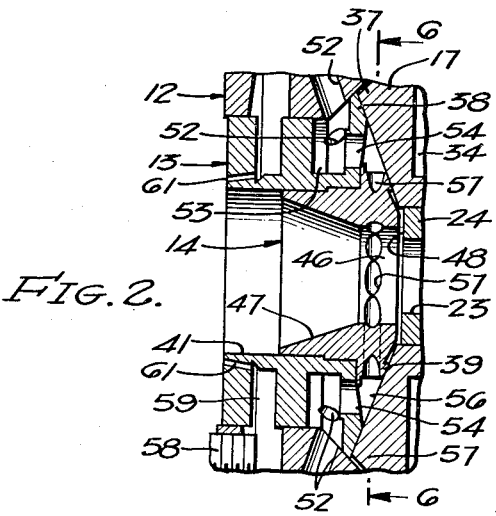
FIGURE 2 is an enlarged fragmentary sectional view of the diffuser and nozzle portions of the apparatus shown in FIGURE 1, the diffuser ring being shown in section instead of in elevation as is the case in FIGURE 1.
Figure 5:
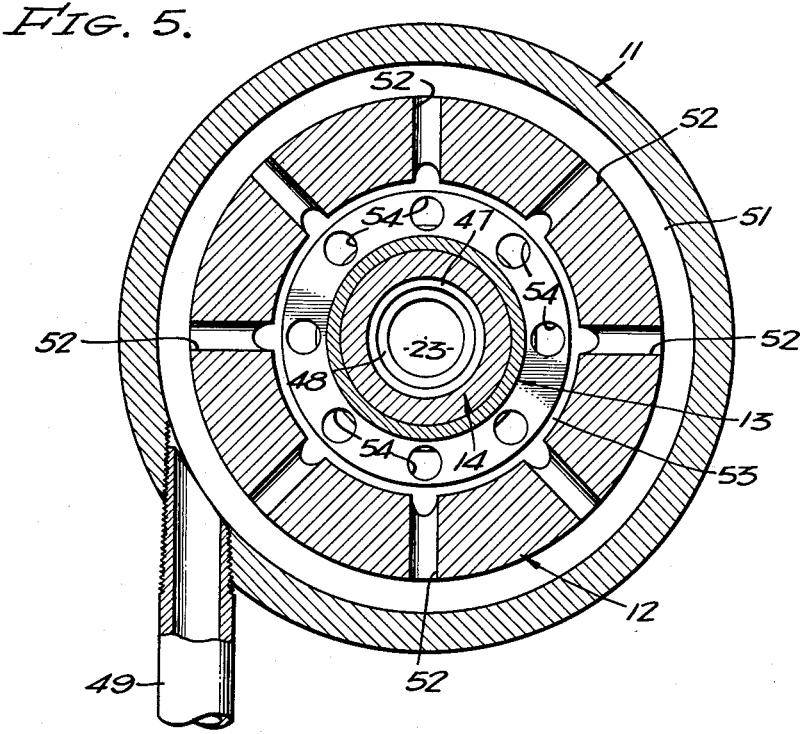
FIGURE 5 is an enlarged section on line 5—5 of FIGURE 1.

The passage or chamber 51 communicates, through a plurality of circumferentially spaced radial passages 52, with a second annular passage or chamber indicated at 53 in FIGURES 1, 2 and 5. Passage 53 is formed forwardly adjacent the flange 38 of nozzle ring 13, and is covered (except at passages 52) by a wall portion of feeding ring 12. From the second annular passage 53, the gas and powder feed rearwardly through a plurality of circumferentially spaced ports 54 in flange 38 and into a third annular passage or chamber 56, the latter being defined by the inner face of flange 38 and the outer frustoconical wall of ridge portion 37 of the nozzle electrode.

Figure 6:
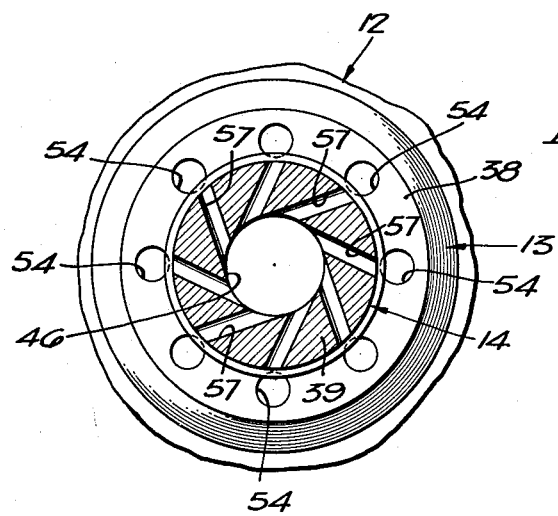
FIGURE 6 is a section on line 6—6 of FIGURE 2, illustrating the means for introducing coating substance tangentially into the jet or flame.

Passage or chamber 56 encompasses the flange 39 of expansion ring 14, and communicates through a plurality of tangential passages 57 with throat 46 thereof. As shown in FIGURE 6, the passages 57 feed powder and gas into substantially the entire circumference of the throat 46, and in a tangential manner effecting whirling or vortical flow. The direction of the whirling or vortical flow is opposite to that created in arc chamber 19 and nozzle opening 23 by the gas flowing through passage 21 (FIGURE 4). Thus, the constricting gas flowing through passage 21 and inlet 27 rotates counter-clockwise in chamber 19, when the torch is viewed from the front, whereas the gas and powder introduced through tangential passages 57 rotate clockwise when the torch is viewed from the front. Such reverse rotation has been found to effect improved mixing between the powder and the plasma emanating from nozzle opening 23.

As previously indicated, the present invention provides a separate and independent flow of gas around the exterior portion 16 of the jet or flame for the purpose of cooling the work and protecting the same from oxidation when such is required. This gas flows from a suitable inlet, indicated at 58 in FIGURES 1 and 3, to a fourth annular passage 59 formed by cooperating annular grooves in feeding ring 12 and nozzle ring 13. The gas then flows forwardly through a large number of circumferentially spaced nozzle openings 61 formed in nozzle ring 13 relatively close to the interior cylindrical wall 41 thereof. The nozzle openings are illustrated as having relatively small diameters, and as converging forwardly at relatively small angles to the axis of the torch. The exterior portion 16 of the jet or flame is thus surrounded by gas emanating from the nozzle openings 61.

The means for supplying gas and powder to the pipe 49, and thus through the tangential inlet passages 57 (FIGURE 6) to the throat 46, is illustrated in FIGURES 1, 3, and 7 to comprise a cup 62 having a relatively large cap 63 threaded thereon, the latter being formed with a conical interior surface 64 which converges upwardly to pipe 49. A conduit 65 is connected to a suitable source of gas pressure, not shown, and feeds into an annular chamber or recess 66 which is covered by a ring 67 mounted on the exterior cylindrical wall of cap 63. Chamber 66 communicates with passages 68 which extend downwardly and obliquely through the cap 63 toward the axis of cup 62. Chamber 66 also communicates with passages 69 which extend through the cap 63, at different elevations, tangentially of the conical surface 64 and in a plane perpendicular to the axis thereof.

From the above it will be understood that gas from conduit 65 enters the annular chamber 66 and flows downwardly into cup 62 through the downwardly converging passages 68. This gas flow has the effect of blowing a certain amount of powdered substance upwardly from cup 62 into the cap 63. Other gas from the annular chamber 63 enters through tangential passages 69 and then whirls upwardly into pipe 49. A combined action is thus achieved which effects thorough mixing of powder with the gas from conduit 65, and efficient flow of the mixture upwardly through the pipe 49.

Not only is the powder efficiently mixed with the gas in the elements 62 and 63, but the mixing action continues throughout chamber 51, passages 52, chamber 53, ports 54, and chamber 56 leading to the tangential inlet passages 57 to throat 46. A highly uniform and thoroughly mixed fluid is thus fed into the plasma stream at the throat 46. The elements 11—13, which thus aid in the mixing action, have the further advantage of being simple to disassemble for cleaning or other purposes, by merely removing the retaining ring 11 which is threaded onto the nozzle electrode 17. The spray apparatus is thus simple to assemble, disassemble, and operate with a minimum of work and effort.

*Summary of the Method of the Invention*

Stated generally, the method of the invention comprises generating a jet or flame of high-temperature plasma, introducing a coating substance into the jet or flame at a point relatively closely adjacent to the outside of the torch which generated the same, effecting a substantial expansion of the jet and contained coating substance, directing the expanded jet against the workpiece to be coated, and simultaneously directing cooling and protective gas around the flame or jet and against the workpiece. Stated more definitely, the method includes the step of introducing the coating substance in a whirling manner into the electrical jet from a plasma jet torch, the direction of whirling being opposite to that of constricting gas introduced into such torch. The flow of cooling and protective gas is separate from the flow of coating substance, and is in much greater volume than the amount of gas employed to carry the coating substance when the latter is in powder form. The temperature of the flame or jet should not be sufficiently high to dissociate the coating substance when it is a compound instead of an element.

With reference to the apparatus illustrated in the drawings, the method comprises introducing gas through conduit 65 (FIGURE 3), annular chamber 66, and passages 68 and 69 into the cup 62 which contains the powder to be coated upon a workpiece. The powder is thus mixed with the gas and is caused to flow upwardly through pipe 49 into the first annular passage 51. From such passage, the gas and powder flow through radial passages 52 (FIGURES 1 and 5), a second annular passage 53, ports 54, a third annular passage 56 (FIGURE 2), and tangential passages 57 (FIGURE 6) into the throat 46 of the expansion ring 14. Gas and powder are thus introduced into a relatively small diameter portion of the plasma jet, and with a whirling motion which is opposite in direction to the whirling motion produced in the plasma jet torch 10 by the constricting gas introduced through passage 21 (FIGURE 4) and inlet opening 27 thereof.

The plasma jet then expands, along with the gas and powder, in the divergent body portion 47 (FIGURE 2) of the expansion ring 14. After substantial completion of expansion, the relatively large diameter jet portion 16 flows through cooling nozzle ring 13 and impinges against the workpiece, not shown. The cylindrical wall 41 of nozzle ring 13 has the effect of insuring that the jet diameter will not expand excessively, and of separating the expanded jet from the nozzle openings 61 for the cooling and protective gas.

The cooling and protective gas enters inlet 58 and flows through annular passage 59 to the nozzle openings 61, from which it emanates to substantially surround the external plasma jet portion 16 and provide a very substantial cooling action upon the workpiece.

Powders which may be applied in accordance with the present invention include metals, ceramics, oxides, carbides, silicides, borides, nitrides, and other compounds. The degree of power input to the plasma torch 10, the amount of arc constriction and other factors should be selected to achieve a plasma temperature sufficiently high to melt the powder, but not effect dissociation thereof when the same is a compound.

The carrier gas for the coating substance should be at relatively low pressure, such as from 10 to 20 p.s.i. gauge. The rate of carrier gas flow may be relatively low, such as 50–250 cubic feet per hour. The carrier gas may comprise inert gases such as argon, where the workpiece or coating substance is subject to oxidation, or may comprise inexpensive substances, such as air, in situations where oxidation is not a factor.

The pressure and rate of flow of the cooling gas are substantially greater than that of the carrier gas. Thus, the cooling gas may be at a pressure of 50 p.s.i. gauge, and have a flow rate of from 250–500 cubic feet per hour.

The relationship by which the cooling gas and carrier gas are maintained separate, and only minimum carrier gas is introduced at the throat 46, produces several highly beneficial results. Thus, cooling of the jet 16 by the carrier gas is minimized, so that the efficiency of the jet in melting the coating substance is maintained. Furthermore, it is pointed out that the gas introduced at throat 46 immediately expands because of the high temperature of the jet, and such expansion would have undesirable effects, such as choking, if the flow of carrier gas were excessive. The relatively large flow of gas through nozzle opening 61 does not have such detrimental effects, but instead the beneficial effect of cooling the work. Furthermore, in situations where oxidation is a factor, the cooling gas may comprise argon, carbon dioxide or other gas which protects the workpiece and the coating substance from oxidation. Where oxidation is not a factor, the cooling gas may comprise air or other inexpensive gas.

It is emphasized that the gas and coating substance introduced at throat 46 is not intended to constrict the plasma or increase its temperature. In fact, the jet 16 expands somewhat from the nozzle opening 23 to the throat 46 due to the fact that the throat has a somewhat larger diameter than the nozzle opening. As distinguished from constriction, the function of the gas and powder entering the throat 46 at passages 37 is to provide a thorough mixing action followed by substantially immediate expansion and impingement against the workpiece.

Various embodiments of the present invention, in addition to what has been illustrated and described in detail, may be employed without departing from the scope of the accompanying claims.

We claim:

1. A plasma-torch spray apparatus, which comprises wall means to define an elongated arc and plasma passage having an open front end and an open rear end, the wall of said passage comprising a surface of revolution about the axis of said passage, said passage wall having a powder injection opening formed therein and spaced a substantial distance from said front end of said passage and also from said rear end of said passage, a substantial portion of said passage between said opening and said front passage end diverging forwardly to permit expansion of plasma passed therethrough between said opening and said front passage end, the remainder of said passage being small in diameter in comparison to said forwardly-diverging portion, electrical conductor means provided at at least the portion of said passage wall adjacent said opening on the opposite side of said opening from said front passage end, a rear electrode having an electrically-conductive arcing portion coaxial with said passage and spaced a substantial distance from said opening on the opposite side thereof from said front passage end, arc-maintaining means to maintain a high-current electric arc between said arcing portion of said rear electrode and said electrical conductor means, said arc-maintaining means including means to pass gas at substantial velocity through said passage from said rear end thereof to and out said front end thereof, said arc-maintaining means being adapted to cause said arc to extend from said arcing portion of said rear electrode through a portion of said passage to said electrical conductor means and terminate at a predetermined region located on the opposite side of said opening from said front passage end, and means to inject coating material in particulate form through said opening into said passage for mixture with the plasma created by interaction between said arc and gas whereby said material is heated for spraying onto a workpiece.

2. A plasma-torch spray apparatus, which comprises wall means to define an elongated arc and plasma passage having an open front end and an open rear end, the wall of said passage having a powder injection opening formed therein and spaced from said front end of said passage and also from said rear end of said passage, electrical conductor means provided at at least a portion of said passage wall, a rear electrode having an electrically-conductive arcing portion coaxial with said passage and spaced a substantial distance from said opening on the opposite side thereof from said front passage end, arc-maintaining means to maintain a high-current electric arc between said arcing portion of said rear electrode and said electrical conductor means, said arc-maintaining means including means to pass gas at substantial velocity through said passage from said rear end thereof to and out said front end thereof, said arc-maintaining means being adapted to cause said arc to extend from said arcing portion of said rear electrode through a portion of said passage to said electrical conductor means, means to inject coating material in particulate form through said opening into said passage for mixture with the plasma created by interaction between said arc and gas whereby said material is heated for spraying onto a workpiece, and means provided adjacent said front passage end to pass large volumes of gas generally parallel to said passage and in a direction toward a workpiece disposed in front of said torch apparatus.

3. A plasma-torch spray apparatus, comprising wall means to define an elongated arc and plasma passage having an open front end and an open rear end, said passage having a metal wall which is a surface of revolution about the axis of said passage, powder-injector means including a second passage extending transversely to said arc and plasma passage and terminating at an opening in said wall, said opening having a short dimension parallel to said axis in comparison to the length of said arc and plasma passage, said opening being spaced a substantial distance from said rear end of said passage, said opening having a cross-sectional size generally on the order of that of said second passage, a rear electrode having an electrically-conductive arcing portion disposed coaxially of said passage and spaced a substantial distance from said opening on the opposite side thereof from said front passage end, power-supply means connected to said arcing portion of said rear electrode and to said metal wall of said passage to maintain a high-current electric arc therebetween, means to pass gas at substantial velocity through said passage from said rear end thereof to and out said front end thereof, said gas means, said arcing portion of said rear electrode and said passage being so related to each other and to said power-supply means that the electric arc maintained between said arcing portion of said rear electrode and said passage wall terminates at a predetermined portion of said wall adjacent said opening and only between said opening and said rear passage end, and powder-supply means to conduct powder to said second passage for injection through said opening into said arc and plasma passage whereby said powder is mixed with and heated by the plasma created by interaction between said arc and gas.

4. The invention as claimed in claim 3, in which the portion of said passage wall between said opening and said rear end of said passage is substantially cylindrical, and in which the portions of said passage wall upstream and downstream from said opening are free of powder-injection openings.

5. The invention as claimed in claim 3, in which said gas means is adapted to effect vortical flow of gas about said axis, and in which said second passage extends tangentially to said arc and plasma passage for tangential introduction of powder into said arc and plasma passage.

6. A plasma-jet torch spray apparatus, which comprises wall means to define a chamber having a substantial diameter, the wall of said chamber comprising a surface of revolution about a central axis, electrically-conductive wall means to define an elongated arc and plasma passage coaxial with said chamber and communicating therewith, the end of said passage remote from said chamber being open and unconstricted, said electrically-conductive wall means having a powder-injector passage extending therethrough transversely of said arc and plasma passage and communicating therewith through a single opening, the size of said opening being on the order of that of said powder-injector passage, said opening being spaced a substantial distance from said chamber and also being spaced a substantial distance from said open end of said arc and plasma passage remote from said chamber, said opening having a dimension parallel to said axis which is very small in comparison to the length of said arc and plasma passage, the remainder of said electrically-conductive wall means being free of powder-injector openings, the portions of said electrically-conductive wall means at said opening and between said opening and said chamber being small in diameter, a rear electrode having an electrically-conductive arcing portion coaxial with said arc and plasma passage and spaced a substantial distance from said opening on the opposite side thereof from said end of said arc and plasma passage remote from said chamber, at least a portion of said rear electrode being disposed in said chamber and having a wall which is a surface of revolution about said axis, insulation means provided adjacent said chamber in radially-outwardly spaced relationship from said axis to insulate said rear electrode from said electrically-conductive wall means, means to introduce gas tangentially into said chamber for vortical flow therein and subsequent flow through said arc and plasma passage and thence against a workpiece, means to inject powder through said powder-injector passage and opening into said arc and plasma passage, means to effect water cooling of at least a portion of said wall means, and powder-supply means to supply a large electric current through an arc circuit including said electrically-conductive wall means and said arcing portion of said rear electrode to thereby maintain an electric arc therebetween, said arcing portion of said rear electrode being so related to said electrically-conductive wall means, to said vortical gas flow and to said power-supply means that said arc passes through at least a portion of said arc and plasma passage between said opening and said chamber and enters said electrically-conductive wall means in the vicinity of said opening and between said opening and said chamber.

7. An electrical plasma-jet spray torch apparatus, which comprises wall means to define an elongated nozzle passage having a narrow or throat portion and also having a widely-divergent portion communicating with said throat portion and with the ambient atmosphere, said divergent portion being of substantial length and having a diameter remote from said throat portion which is much greater than that of said throat portion, means to maintain a high-current electric arc in said passage adjacent at least said throat portion thereof, means to pass gas through said passage in a direction from said throat portion through said divergent portion and thence to the ambient atmosphere, said gas being heated to a high temperature by said arc, and means to introduce coating material laterally into said passage through the wall thereof and in the immediate vicinity of said throat portion, said coating material being melted by the heat of said arc and being entrained in said gas for flow through said divergent portion and subsequent impingement against a workpiece.

8. The invention as claimed in claim 7, in which said means to introduce coating material laterally into said nozzle passage includes a powder passage extending through said wall means and opening into said nozzle passage, and means to effect injection of powder through said powder passage into said nozzle passage.

9. The invention as claimed in claim 7, in which said divergent portion of said nozzle passage is generally frustoconical.

10. The invention as claimed in claim 7, in which said wall means further defines a generally cylindrical portion communicating with the wide end of said divergent portion and having generally the same diameter, all of said portions of said nozzle passage being coaxial.

11. The invention as claimed in claim 7, in which the region of coating-material introduction is located in a portion of said nozzle passage having a somewhat larger diameter than the minimum-diameter portion of said nozzle passage, said region being disposed adjacent and downstream from such minimum-diameter portion.

References Cited in the file of this patent

UNITED STATES PATENTS

| | | |
|---|---|---|
| 3,010,009 | Ducati | Nov. 21, 1961 |
| 3,071,678 | Neely et al. | Jan. 1, 1963 |